United States Patent [19]
Takada et al.

[11] 3,943,765
[45] Mar. 16, 1976

[54] ELECTROMAGNETIC FLOW METER

[75] Inventors: Keisuke Takada, Hino; Ryouji Gamo, Higashi Murayama; Ikuo Sato, Euchu, all of Japan

[73] Assignee: Tokyo Shibaura Electric co., Ltd., Kawasaki, Japan

[22] Filed: Feb. 20, 1975

[21] Appl. No.: 551,325

[52] U.S. Cl. .......................................... 73/194 EM
[51] Int. Cl.² ........................................... G01F 1/58
[58] Field of Search .............................. 73/194 EM

[56] References Cited
UNITED STATES PATENTS

| | | | |
|---|---|---|---|
| 2,729,103 | 1/1956 | Raynsford et al. | 73/194 EM |
| 3,246,176 | 4/1966 | Nazareth, Jr. | 73/194 EM X |
| 3,802,263 | 4/1974 | Krechmery et al. | 73/194 EM |

*Primary Examiner*—Charles A. Ruehl
*Attorney, Agent, or Firm*—Oblon, Fisher, Spivak, McClelland & Maier

[57] ABSTRACT

An electromagnetic flow meter comprising a circuit for generating signals proportional to the intensity of an A.C. magnetic field impressed on a fluid running through a pipe; a first switch rendered conducting for a prescribed period simultaneously with an A.C. voltage obtained in proportion to the period of the A.C. magnetic field; a second switch actuated after the conduction of the first switch; a circuit for integrating outputs corresponding to the flow rate of a fluid obtained through the first switch and further integrating said outputs with an opposite polarity; a circuit for rendering the second switch nonconducting when an output from said integration circuit reaches a referential level; and a circuit for generating an output corresponding to the period in which said outputs are integrated, for each operating cycle of said integration circuit.

13 Claims, 11 Drawing Figures

ELECTROMAGNETIC FLOW METER

This invention relates to an electromagnetic flow meter and more particularly to improvements on an A.C. electromagnetic flow meter.

An A.C. electromagnetic flow meter is so designed as to apply an A.C. magnetic flux to a fluid passing through a pipe and detecting signals corresponding to the amount of said fluid running through the pipe per unit time. In this case, however, an A.C. magnetic flux applied to a fluid varies with the voltage of a power source, giving rise to errors in measuring the flow rate of a fluid. To eliminate such errors, it may be contemplated to connect, for example, a transformer in series to a device for applying an A.C. magnetic flux to a fluid to draw out an A.C. voltage proportional to said A.C. magnetic flux and dividing a signal representing the flow rate of the fluid by said A.C. voltage. This process can indeed save a signal denoting said flow rate from the effect of fluctuation in the voltage of a power source. However, additional provision of such a division circuit for a flow meter unavoidably renders the entire arrangement complicated and results in the high cost of a flow meter device. Moreover, a noise signal of a phase shifted 90° from that of a power source voltage caused by electromagnetic coupling in the flow meter is included in the detecting signal in addition to the signal proportional to flow rate. This 90°-shifted noise has an amplitude comparable with that of the source voltage and constitutes a significant factor in generating errors of detection. To avoid said 90°-shifted noise, it may be contemplated to rectify a detection signal using, for example, a synchronous rectifier. However, this also leads to the complicated arrangement and high cost of a flow meter as a whole. In addition, the circuit elements included in the prior art A.C. electromagnetic flow meter whose characteristics vary with ambient temperature also exert a very disadvantageous effect on the precision with which the flow rate of a fluid passing through a pipe should be determined.

It is accordingly the object of this invention to provide a high precision electromagnetic flow meter capable of effectively eliminating errors resulting from fluctuations in the voltage of a power source, 90°-shifted noises and changes in ambient temperature by means of a simple arrangement.

According to an aspect of this invention, there is provided an electromagnetic flow meter which comprises a pipe for conducting a fluid; a magnetic flux-generating device for applying an A.C. magnetic flux to the fluid running through the pipe; a detection circuit for detecting a signal denoting a product arrived at by multiplying together the inner diameter of the pipe, the density of said magnetic flux and the velocity of the fluid; a device for generating an A.C. voltage in proportional to said A.C. magnetic flux; a first switch supplied with said detection signal; a first switch-controlling circuit for closing said switch for at least a positive or negative half period of the A.C. voltage thus generated; an A.C.-D.C. converting circuit for changing the A.C. voltage to a D.C. voltage; a second switch supplied with an output from said A.C.-D.C. converting circuit; means for reversing the polarity of an output from the second switch from that of the detection signal; an integration circuit for integrating outputs from the first switch and then integrating outputs from the second switch; a second switch-controlling circuit for closing the second switch after the positive or negative half period and opening said second switch when the integrated outputs reach a referential level; and an output device for producing an output indicating the flow rate of a fluid corresponding to the period in which outputs from the A.C.-D.C. converting circuit are integrated, for each operating cycle of the integration circuit.

This invention can be more fully understood from the following detailed description when taken in conjunction with the accompanying drawings, in which.

Figure 1:
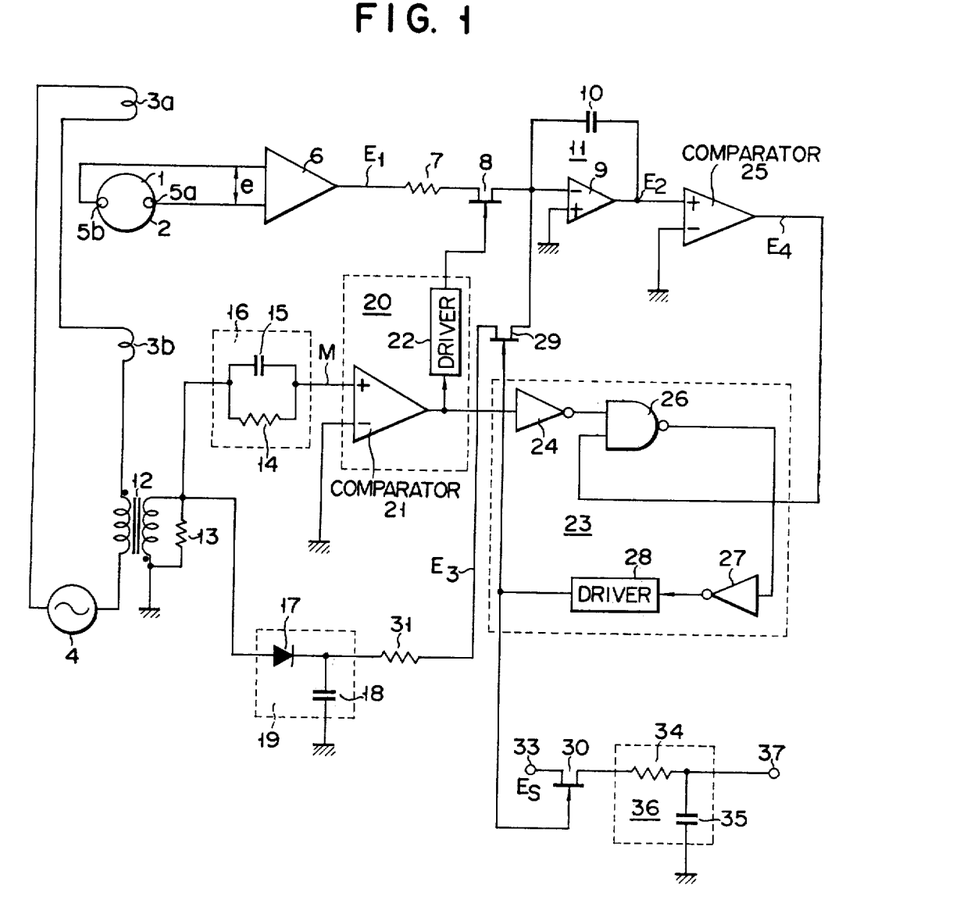
FIG. 1 is a block circuit diagram of an A.C. flow meter according to an embodiment of this invention.

Referring to FIG. 1, a pair of exciting coils 3a, 3b are provided outside of a pipe 2 through which a conductive fluid 1 flows. The exciting coils 3a, 3b are connected in series to an A.C. source 4. An A.C. magnetic flux generated by each of said exciting coils 3a, 3b is applied at right angles to the flow line of a fluid 1 traveling through the pipe 2. An electromotive force is produced in the directions perpendicular to both the flow line of the fluid 1 and the A.C. magnetic flux applied to said fluid 1. A pair of signal-detecting electrodes 5a, 5b are provided on the inner walls of the pipe 2 to detect said electromotive force. A voltage detected across said electrodes 5a, 5b has a magnitude proportional to the flow rate of the fluid 1 passing through the pipe 2.

A detection signal appearing between the electrodes 5a, 5b is amplified by an A.C. type differential amplifier 6, an output from which is impressed through a resistor 7 on one of the electrodes of a first switch 8 consisting of, for example, a field effect transistor (hereinafter referred to as "an FET"). A signal supplied to the first switch 8 is further conducted upon its closure to an arithmetic operation amplifier 9 and also to the input terminal of an integration circuit 11 consisting of a capacitor 10 connected between the input and output terminals of said arithmetic operation amplifier 9.

The primary winding of a transformer 12 is connected in series to the exciting coils 3a, 3b, and both ends of the secondary winding of said transformer 12 are connected to a resistor 13. This arrangement causes both ends of the resistor 13 to be impressed with an A.C. voltage proportional to the magnitude of a magnetic flux applied to the fluid 1 from the exciting coils 3a, 3b. One end of the resistor 13 is grounded and the other end thereof is connected to one end of a phase shifter 16 consisting of a resistor 14 and capacitor 15 and also to one end of an A.C.-D.C. converting circuit 19 consisting of a diode 17 and capacitor 18. An output from the phase shifter 16 is supplied to one positive input terminal of a comparator 21 included in a first switch-controlling circuit 20. Since the other negative input terminal of the comparator 21 is grounded, an output from the phase shifter 16 is conducted to a switch-driving circuit 22 and also to an inverter 24 of a second switch-controlling circuit 23, each time said output is brought to a negative level. The phase shifter 16 is used to attain a coincidence between an output from the A.C. type differential amplifier 6, namely, the phase of a signal detecting the flow rate of a fluid and the phase of a signal supplied to said one positive input terminal of the comparator 21. Accordingly, an output from the switch-driving circuit 22 is supplied to the first switch 8, namely, the gate electrode of the FET 8 as a switch-controlling signal, each time the polarity of a detection signal is turned negative, so as to close first switch 8. Therefore, the integration circuit 11 is supplied with a signal representing the negative half period of the detection signal.

An output from the integration circuit 11 is delivered to one positive input terminal of a comparator 25, the other negative input terminal of which is grounded. Thus, the comparator generates an output, when an output from the integration circuit 11 has a higher level than zero. The output terminal of the comparator 25 is connected to one input terminal of the NAND gate 26 of the second switch-controlling circuit 23, the other input terminal of said NAND gate 26 being supplied with an output from the inverter 24. An output from the NAND gate 26 is delivered through an inverter 27 to the input terminal of a switch-driving circuit 28. An output from the switch-driving circuit 28 is supplied as a switch-controlling signal to the gate electrode of an FET constituting a second switch 29 and also to the gate electrode of an FET used as a third switch 30.

The second switch 29 is supplied through a resistor 31 with an output from the A.C.-D.C. converting circuit 19. A D.C. signal of negative polarity from said converting circuit 19 is further conducted through the second switch 29 to the input terminal of the integration circuit 11. Since the diode 17 has the indicated polarity, a detection signal from the first switch 8 and a signal from the second switch 29 have opposite polarities. Therefore, the integration circuit 11 integrates outputs from the first switch 8 and those from the second switch 29 in opposite directions by turns.

One electrode of the third switch 30 is connected to a terminal 33 impressed with a referential voltage $E_s$ and the other electrode of said third switch 30 is connected to the input terminal of a smoothing circuit 36. Referential numeral 37 denotes the output terminal of the subject flow meter.

Figure 2:
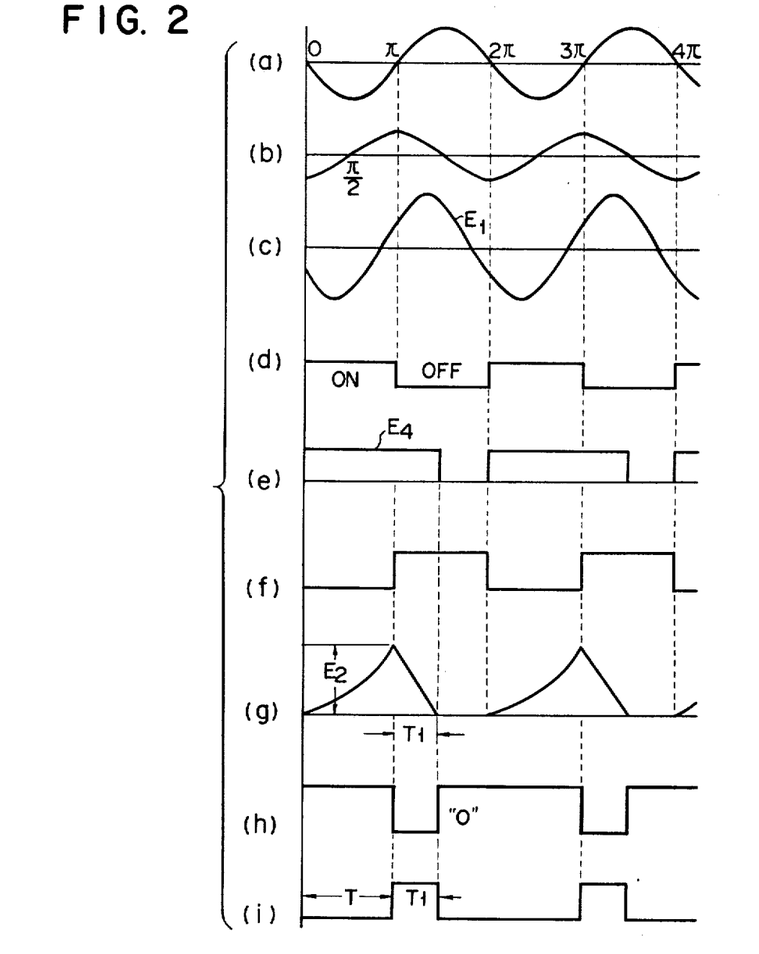
FIG. 2 presents the wave forms of signals by way of illustrating the operation of the flow meter of FIG. 1.

There will now be described by reference to FIG. 2 the operation of an A.C. electromagnetic flow meter of FIG. 1. A detection signal appearing between the signal-detecting electrodes 5a, 5b and supplied to the first switch 8 through the amplifier 6 and resistor 7 has a sine wave form shown in, for example, FIG. 2 (a). This detection signal contains a noise component shifted 90° in phase from the detection signal as illustrated in FIG. 2 (b). Thus, a composite signal consisting of said detection signal and noise presents a wave form indicated in FIG. 2 (c). Namely, an input e to the A.C. type differential amplifier 6 may be expressed by the following formula:

$$e = BD \, v \sin wt + E_n \sin (wt \pm \frac{\pi}{2}) \qquad (1)$$

where:
$B$ = density of a magnetic flux applied to a fluid 1
$D$ = inner diameter of a pipe 2
$v$ = velocity of a fluid passing through the pipe 2
$E_n$ = amplitude of a noise shifted 90° in phase An output $E_1$ amplified by the differential amplifier 6 is the one where only portions represented by the constant terms D and $E_n$ are amplified. With said constant terms D and $E_n$ denoted by $k_1$ and $k_2$ respectively, the output $E_1$ may be expressed as follows:

$$E_1 = k_1 B v \sin wt + k_2 \sin (wt \pm \frac{\pi}{2}) \qquad (2)$$

Since an output M from the phase shifter 16 has the same phase as the wave form of a detection signal shown in FIG. 2 (a), an output from the comparator 21 also has the same phase as indicated in FIG. 2 (f), causing the first switch 8 to be rendered conducting and nonconducting by turns as illustrated in FIG. 2 (d). Namely, the FET 8 is turned on only when the signal $E_1$ has a negative level and turned off only when said signal $E_1$ has a positive level. Thus a detection signal continues to be supplied to the integration circuit 11 through the first switch 8, while the phase of FIG. 2 (a) is shifted, for example, from 0 to $\pi$. As apparent from FIG. 2 (a), the detection signals have a negative level for a period from 0 to $\pi$ and are effectively integrated by the integration circuit 11. Since, however, the 90°-shifted noise has a negative level for a period from 0 to $\pi/2$ and a positive level for a period from $\pi/2$ to $\pi$, the result of integration carried out for a period from 0 to $\pi$ has a value of zero. This means that the 90°-shifted noise is effectively suppressed by the integration circuit 11. An output $E_2$ from the integration circuit 11 may therefore be expressed by the following equation:

$$E_2 = \frac{-1}{CR} \int_0^\pi E_1 \, dt = - \frac{k_1 B v T}{CR \pi} \qquad (3)$$

where:
$CR$ = time constant of integration undertaken by the integration circuit 11
$T$ = a period from 0 to $\pi$ Thus, the integration circuit 11 continues to integrate outputs from the first switch 8 in the positive direction as shown in FIG. 2 (g). Since, at this time, a signal supplied to one input terminal of the comparator 25 has a zero level, an output from the comparator 25 is brought to a state indicated by a logical code 1, when an output from the integration circuit 11 turns positive. This output of 1 has a wave form indicated in FIG. 2 (e). Where, under this condition, an output M from the phase shifter 16 has its level reduced to zero, the first switch 8 is rendered nonconducting and an output from the comparator 21 is brought to the state of a logical code 0. Said output of 0 is inverted to a signal of 1 (FIG. 2 (f)) by the inverter 24. This inverted output of 1 from the inverter 24 is supplied to the NAND gate 26 together with an output of 1 from the comparator 25. The NAND gate 26 delivers an output of 0 to the inverter 27, which in turn supplies an output of 1 to the switch-driving circuit 28. Upon receipt of an input of 1, the switch-driving circuit 28 sends a switch-driving signal to the second and third switches 29, 30 so as to close them. At the point of time π, an output $E_3$ from the A.C.-D.C. converting circuit 19 bearing the wave form of FIG. 2 (h) is supplied to the integration circuit 11 through the second switch 29 and inverter 32. An output from the integration circuit 11 is linearly attenuated, as shown in FIG. 2 (g), in the negative direction down to a zero level during a period of T1. Where an output from the integration circuit 11 has its level reduced to zero, then an output from the comparator is brought to the state of 0 as indicated in FIG. 2 (e). On the other hand, an output from the inverter 24 maintains the state of 1 as shown in FIG. 2 (f). Consequently, an output from the NAND gate 26 is changed to 1 indicated in FIG. 2 (h), causing the switch-driving circuit 28 to be reset by a 0 output from the inverter 27 and the second and third switches to be turned off. FIG. 2 (i) presents the wave form of a signal obtained on the output side of the third switch 30.

To explain the above-mentioned operation by means of equations, an output $E_3$ from the A.C.-D.C. converting circuit 19 bears a proportion only to exciting current or the density $B$ of a magnetic flux. With $k_3$ taken to be a constant, therefore, said output $E_3$ may be expressed as follows:

$$E_3 = k_3 B \qquad (4)$$

Now let $T_1$ of FIG. 2 (g) represent the period required for an output $E_2$ from the integration circuit 11 to have its level reduced to zero after the second switch 29 is closed at the point of time π. Then the following equation results:

$$E_2 + \frac{1}{RC} \int_0^{T_1} E_3 \, dt = 0 \qquad (5)$$

Therefore, the following equation is derived from the equations (3), (4) and (5):

$$T_1 = k_4 \, v \, T \qquad (6)$$

where $k_4$ is a constant. As apparent from the above equation (6), $T_1$ is unrelated to the density B of a magnetic flux. Since $T$ is constant, $T_1$ denotes a value only proportional to the velocity $v$ of the fluid 1 running through the pipe 2. Therefore, the ratio of $T_1$ to $T$ always maintains a value only proportional to the vecity v of the fluid 1.

Since the third switch 30 is rendered conducting for the same period of $T_1$ (FIG. 2 (i)) as the second switch 29, a D.C. voltage obtained from the output terminal 37 of the flow meter by smoothing the referential voltage $E_d$ in the smoothing circiut 36 also bears proportion only to the velocity $v$ of the fluid 1, thereby providing an analogue signal representing the accurate flow rate of the fluid 1 free from the 90° shifted noise and variations in the density B of a magnetic flux. Since the aforesaid equation (6) does not include the constants C and R associated with the elements of the integration circuit 11, it is possible to avoid errors in measuring the flow rate of a fluid 1 which might otherwise arise from a characteristic variations of the contents C and R and of amplifiers, etc. caused by the variations of the ambient temperature and secular change.

Since, as mentioned above, the flow meter of this invention indicates its output essentially in the form of time T or time ratio $T_1/T$, said flow meter can show the flow rate of a fluid 1 not only in the form of an analogue output using a smoothing circuit 36 as in the embodiment of FIG. 1, but also in the form of a digital output.

Figure 3:
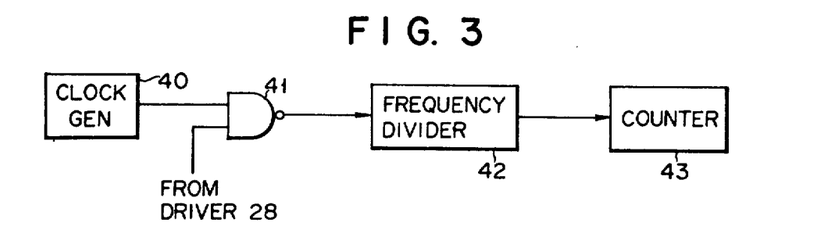
FIG. 3 is a block circuit diagram of a flow meter digitally indicating an output denoting the flow rate of a fluid obtained by the invention.

FIG. 3 is a block circuit diagram of the flow meter of this invention which can indicate the flow rate of a fluid in the form of a digital output. According to this arrangement, an output, for example, from the switch-driving circuit 28 of FIG. 1 is supplied to a NAND gate 41 together with a clock pulse generated by a clock pulse generator 40. Namely, an output from the switch-driving circuit 28 is used as a gate signal and clock pulses having a number corresponding to a period of $T_1$ are divided in frequency by a frequency divider 42. Thereafter, the frequency divided clock pulses are supplied to a proper counter 43. Thus, the flow rate of a fluid 1 can be easily indicated by digital signals. The accumulated value of the output pulses is proportional to the accumulated amount of fluid flowing in the flow meter.

Further, if the switch-driving circuit 28 and switch 30 of FIG. 1 are connected, though not shown, by a known photocoupler consisting of, for example, a light emitting diode and phototransistor, then electric insulation can be effected between the flow meter and an output indicator. This arrangement offers the advantage of preventing errors in measuring the flow rate of a fluid, particularly in case the flow meter and output indicator are remotely separated from each other.

Since the time-constant of the A.C.-D.C. converting circuit 19 of FIG. 1 is very large, one cannot obtain the output voltage of the circuit 19 in proportion to the voltage of the power supply in case of a rapid variation of the power supply voltage. This causes an error in measuring the flow rate of the fluid.

Figure 4:
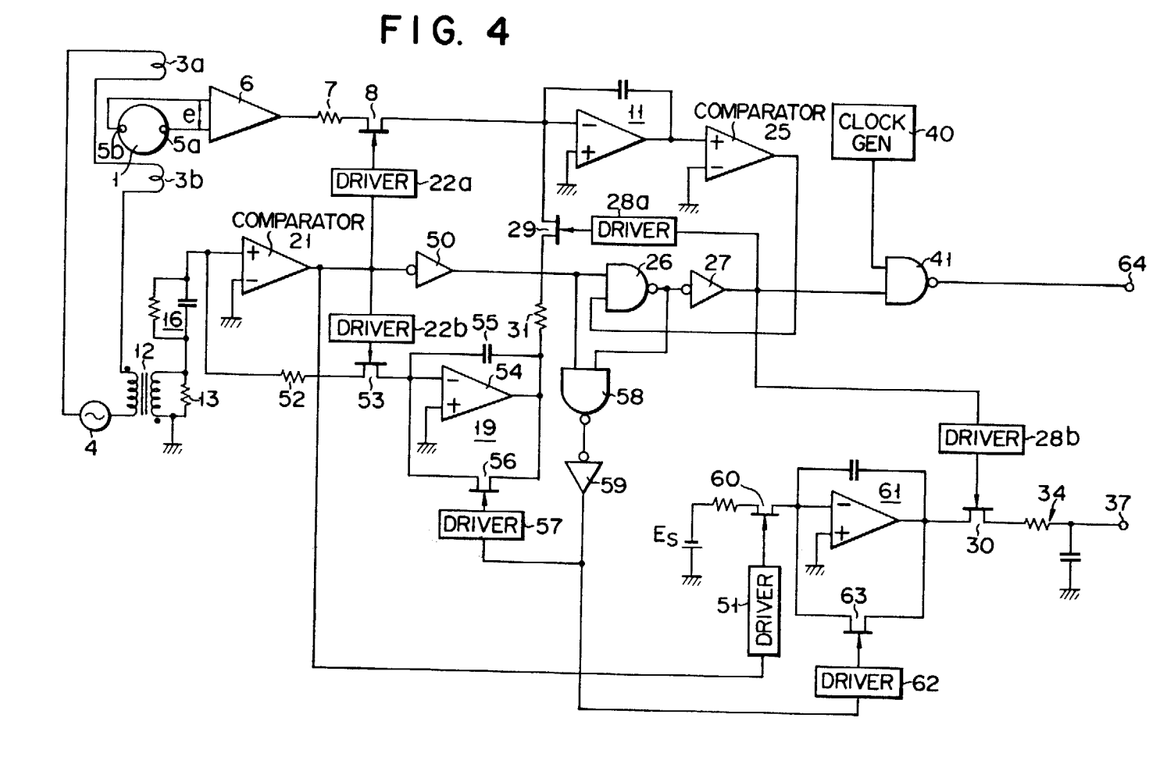
FIG. 4 is a block circuit diagram of a flow meter according to another embodiment of the invention.
Figure 5:
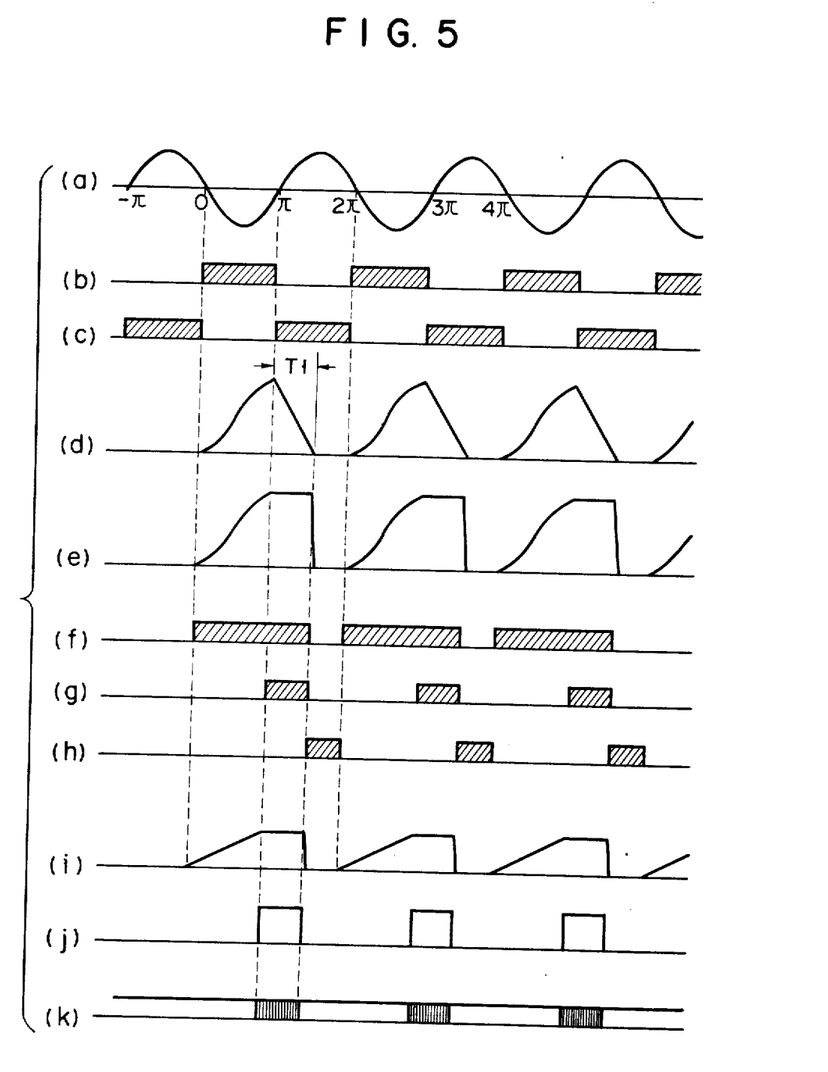
FIG. 5 shows the wave forms of signals by way of illustrating the operation of the flow meter of FIG. 4.

FIG. 4 shows a circuit arrangement of a flow meter according to another embodiment of this invention which has been improved from the flow meter of FIG. 1 to elevate the precision of measurement in view of the above drawbacks of Embodiment of FIG. 1. The parts of FIG. 4 which are the same as those of FIG. 1 are denoted by the same numerals and description thereof is omitted. Now let it be assumed that an output from the differential amplifier 6 is a sine wave signal bearing the phase of FIG. 5 (a). Then, an output from the comparator 21 is a positive pulse having, as shown in FIG. 5 (b), a width corresponding to the negative period of an output from the differential amplifier 6. This positive pulse is supplied from the comparator 21 to the switch-driving circuits 22a, 22b, inverter 50 and a switch-driving circuit 51 at the same time. An output from the inverter 50 takes the form of a pulse signal shown in FIG. 5 (c) which is of the opposite polarity to an output from the comparator 21.

Where a switch-driving signal is supplied from the comparator 21 to the switch-driving circuit 22a, then the first switch 8 is closed. As the result, outputs from the differential amplifier 6 are supplied to the integrator 11 for integration for a period, for example, from 0 to π. Thus an output from the integrator 11 increases as shown in FIG. 5 (d) for a period from 0 to π.

On the other hand, the output terminal of the phase shifter 16 is connected through a resistor 52 and FET switch 53 to the negative side terminal of an operational amplifier 54 constituting the A.C.-D.C. converting circuit 19, causing the switch-driving circuit 22b to be operated by an output from the comparator 21 for a period from 0 to $\pi$. As the result, the FET switch 53 is closed and an output from the phase shifter 16 is conducted to the operational amplifier 54. Accordingly, the comparator 54 generates an output progressively increasing from the point of time 0 to the point of time $\pi$ as shown in FIG. 5 (e). This increased output is delivered to the second switch 29 through the resistor 31. A capacitor 55 and FET switch 56 are connected parallel between the input and output terminals of the operational amplifier 54. The FET 56 has its operation controlled by a signal from the switch-driving circuit 57.

An output from the integration circuit 11 is supplied to the comparator 25, which in turn produces an output having a fixed amplitude as shown in FIG. 5 (f) which increases according to an output from the integration circuit 11 bearing the wave form indicated in FIG. 5 (d). Said output from the comparator 25 is conducted to the NAND gate 26 together with an output from the inverter 50 having the wave form of FIG. 5 (c). The NAND gate 26 is supplied with two input signals indicated by logical codes of 1 and 0 for a period from 0 to $\pi$. Accordingly, an output from the NAND gate 26 takes the form of 1, and an output from the inverter 27 maintains the form of 0 as shown in FIG. 5 (g) for a period from 0 to $\pi$. An output from the NAND gate 26 is delivered to the NAND gate 58 together with a signal supplied to one input terminal of said NAND gate 26. Since input signals to the NAND gate 58 maintain the forms of 0 and 1 respectively for a period from 0 to $\pi$, an output from the NAND gate 58 is brought to the state of 1. Therefore, an output from the inverter 59 presents the state of 0 as shown in FIG. 5 (h). Since said output from the inverter 59 is delivered to the switch-driving circuit 57, the FET switch 56 remains open for a period from 0 to $\pi$, causing an output from the operational amplifier 54 to be charged in the capacitor 55.

Further, the switch-driving circuit 51 is operated by an output from the comparator 21 for a period from 0 to $\pi$. Accordingly, an FET switch 60 is closed and the referential voltage $E_s$ is impressed on the negative side input terminal of an integration circuit 61.

Since a driving signal is not supplied from the inverter 59 to a switch-driving circuit 62, an FET switch 63 is opened and the integration circuit 61 integrates $E_s$ signals supplied from the FET switch 60 and produces an output progressively increasing from the point of time 0 to the point of time $\pi$ as shown in FIG. 5 (i). An output from the integration circuit 61 is delivered to the FET switch 30, but the switch-driving circuit 28b is not supplied with a driving signal. Therefore, the output terminal 37 of the flow meter does not generate an output. Since a signal supplied to one input terminal of the NAND gate 41 remains in the state of 0, said gate 41 is not opened, nor a digital output terminal 64 is supplied with a clock pulse from the clock pulse generator 40. During a period from 0 to $\pi$, a 90°-shifted noise contained in an output from the differential amplifier 6 is of course effectively suppressed in the integration circuit 11 as in the case of FIG. 1.

When an output from the differential amplifier 6 has its phase shifted to $\pi$, an output from the comparator 21 has its level brought to zero in synchronization with said output from the differential amplifier 6. As the result, the FET switches 8, 53, 60 are opened through the switch-driving circuits 22a, 22b, 51, causing an output from the inverter 50 to take the form of 1 as shown in FIG. 5 (c) for a period from $\pi$ to $2\pi$. A 1 output from the inverter 50 is conducted to the NAND gate 26. Since, at this time, an output from the comparator 25 maintains the form of 1 as indicated in FIG. 5 (f), an output from the NAND gate 26 is brought to the state of 0, causing the switch-driving circuit 28a to be actuated by a 1 output from the inverter 27. The FET switch 29 is closed by an output from the switch-driving circuit 28a and the integration circuit 54 delivers an output bearing the wave form of FIG. 5 (e) to the integration circuit 11. An output from the integration circuit 19 has an opposite polarity to an output from the differential amplifier 6. Therefore, the integration circuit 11 carries out integration in the opposite direction starting from the point of time $\pi$. An output from said integration circuit 11 is linearly attenuated from the point of time $\pi$ as shown in FIG. 5 (d) and falls to a zero level after a period of $T_1$.

Since, during the period of $T_1$, an output from the inverter 27 takes the form of 1 as shown in FIG. 5 (g), and an output from the inverter 59 is brought to the state of 0 as indicated in FIG. 5 (h), an output from the integrator 61 still maintains a value attained at the point of time $\pi$ through the opening of the switch 63, namely, presents the wave form of FIG. 5 (i). the switch-driving circuit 28b is actuated to close the switch 30 and an output bearing the wave form of FIG. 5 (j) appears on the output side of said switch 30. At this time, a 1 output from the inverter 27 opens the NAND gate 41, causing clock pulses from the clock pulse generator 40 as shown in FIG. 5 (k) to appear at the digital output terminal 64 of the flow meter. When, therefore, clock pulses appearing at said digital output terminal 64 are counted as in the case of FIG. 3, then the flow rate of a fluid can be digitally indicated.

Where an output from the integration circuit 11 falls to zero in a period of $T_1$ after the point of time $\pi$, then an output from the comparator 25 is brought to the state of 0, and an output from the NAND gate 26 takes the form of 1. As the result, an output from the NAND gate 58 presents the state of 0 and an output from the inverter 59 which is supplied to the switch-driving circuit 57 is turned to the state of 1, causing the FET switch 56 to be closed. Accordingly, short circuiting takes place across the input and output terminals of the integration circuit 54, an output from which rapidly falls to zero as shown in FIG. 5 (e).

An output from the inverter 27 is brought to the state of 0 as shown in FIG. 5 (g), and the switches 29, 30 are opened, causing outputs from the digital output terminal 64 and the analogue output terminal 37 to fall to zero.

Where an output from the differential amplifier 6 has its phase shifted to $2\pi$, then an output from the comparator 21 appears again. At this time an output from the inverter 50 takes the form of 0 and an output from the inverter 59 is brought back to the state of 0. Operation during a period from $2\pi$ to $4\pi$ is the same as during a period from 0 to $2\pi$. The larger the amount of a fluid 1 running through the pipe 2, the more increased an output from the diferential amplifier 6. As the result, the voltage integrated by the integration circuit 11 during a period from 0 to $\pi$ or from $2\pi$ to $3\pi$ grows higher. Since an output from the integration circuit 54 has a constant voltage, the period of $T_1$ in which an amount of outputs is integrated in the opposite direction is lengthened to the same extent as that to which an amount of outputs integrated in the normal direction increases. Thus the flow rate of a fluid 1 passing through the pipe 2 bears a proportional relationship with the period $T_1$ of reverse integration. Consequently an analogue output from the output terminal 37 of the flow meter or a digital output from its output terminal 64 indicates a magnitude proportional to the flow rate of a fluid 1 traveling through the pipe 2.

Figure 6:
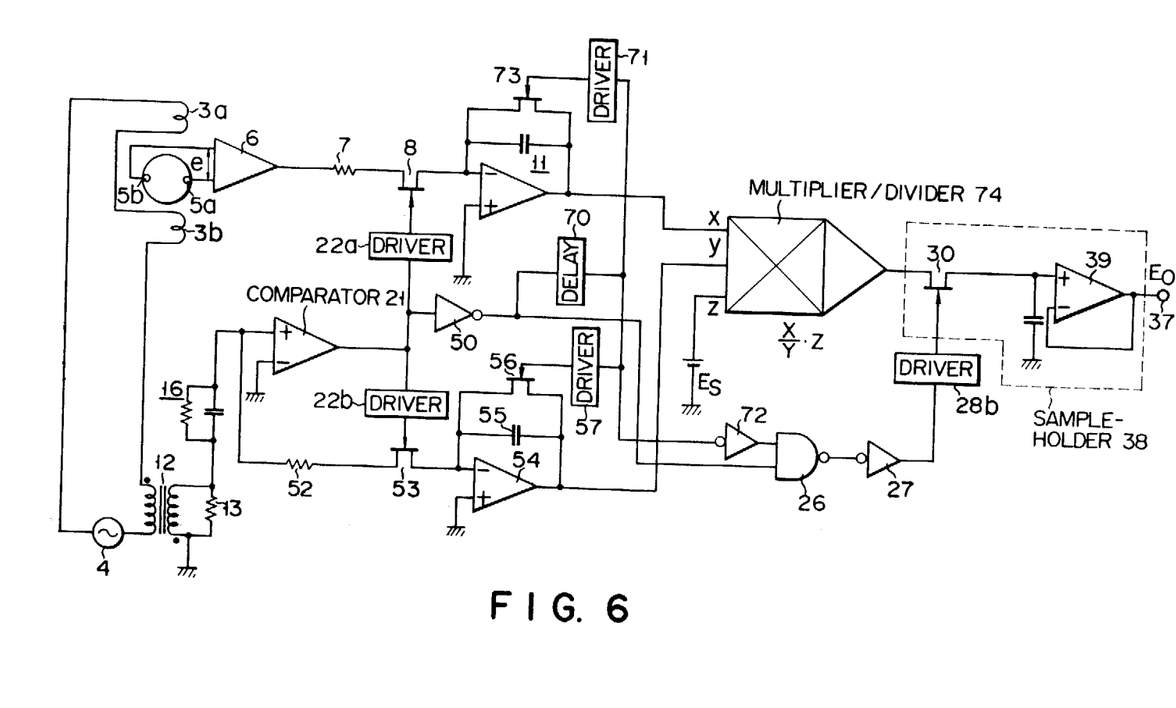
FIG. 6 is a block circuit diagram of a flow meter according to still another embodiment of the invention.
Figure 7:
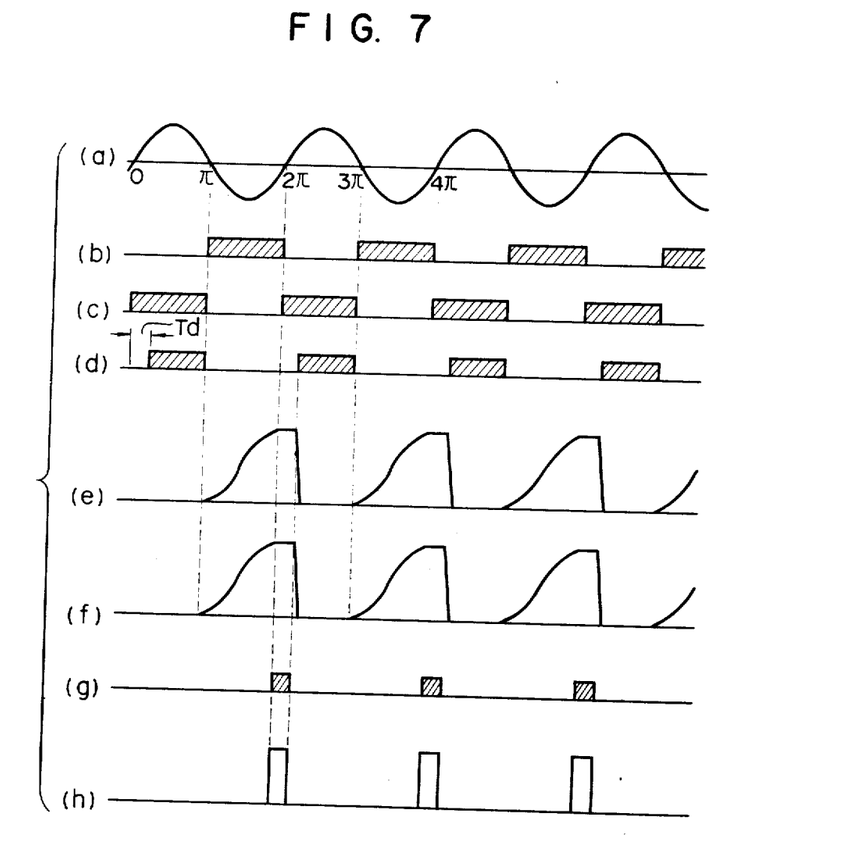
FIG. 7 indicates the wave forms of signals by way of illustrating the operation of the flow meter of FIG. 6.

FIG. 6 is a circuit diagram of a flow meter according to still another embodiment of this invention. There will now be described the operation of this embodiment by reference to FIG. 7 showing the wave forms of signals appearing in said embodiment. An output signal from the differential amplifier 6 which has detected the flow rate of a fluid 1 conducted through the pipe 2 has a sine wave as shown in FIG. 7 (a). During a period from 0 to $\pi$ in which there appears a signal detecting the flow rate, an output from the comparator 21 takes the form of 0 as shown in FIG. 7 (b) and consequently an output from the inverter 50 is brought to the state of 1 as shown in FIG. 7 (c). An output from the inverter 50 is supplied to one input terminal of the NAND gate 26 and also to a delay circuit 70. This delay circuit 70 produces an output in a time $t$ after the delay circuit 70 is supplied with an output from the inverter 50. An output from said delay circuit 70 is conducted to the switch-driving circuits 57, 71 and inverter 72. The FET switches 56, 73 are rendered conducting by the switch-driving circuits 57, 71 for a period from 0 to $\pi$. Therefore, outputs $x$ and $y$ from the integration circuits 11, 54 are reduced to zero as shown in FIGS. 7 (e) and (f).

When an output from the differential amplifier 6 has its phase shifted to $\pi$, then an output from the comparator 21 takes the form of 1 as indicated in FIG. 7 (b), and in consequence outputs from the inverter 50 and delay circuit 70 are brought to the state of 0 as shown in FIGS. 7 (c) and (d). As the result, the switch-driving circuits 57, 71 are deenergized to open the switches 56, 73, and the integration circuits 11, 54 commence integration. Since an output from the comparator 21 maintains the form of 1 as indicated in FIG. 7 (b) for a period from $\pi$ to $2\pi$, the switches 8, 53 are closed by the switch-driving circuits 22a, 22b. Outputs from the differential amplifier 6 and phase shifter 16 are integrated, as shown in FIGS. 7 (e) and 7 (f) by the integration circuits 11, 54 respectively. These integrated outputs $x$, $y$ are supplied to a multiplier-divider 74 together with a referential voltage $E_s$ (referred to as $z$ throughout the embodiment of FIG. 6). The multiplier-divider 74 carries out the arithmetical operation of said three inputs $x$, $y$ and $z$ by the formula of $x \cdot z / y$.

Where an output from the differential amplifier 6 which has detected the flow rate of a fluid 1 has its phase shifted to $2\pi$, then an output from the comparator 21 takes the form of 0 and an output from the inverter 50 is brought to the state of 1. Under this condition, the switches 8, 53 remain open and the switches 56, 73 are also left open. Accordingly, an output from the integration circuit 11 maintains a value attained when the phase is shifted to $2\pi$ as shown in FIGS. 7 (e) and (f). On the other hand, an output from the delay circuit 70 maintains the state of 0 and an output from the inverter 50 is kept in the state of 1, until a delay time $T_1$ passes from the point of time $2\pi$. Therefore, an input to the NAND gate 26 takes the form of "1,1" and an output therefrom presents the state of 0. As the result, a driving signal bearing the wave form of FIG. 7 (g) is supplied to the switch-driving circuit 28b to open the switch 30. An output from the multiplier-divider 74 bearing the wave form of FIG. 7 (b) appears on the output side of the switch 30. This output passes through the smoothing circuit 34 and appears at the output terminal 37 of the flow meter as an analogue signal indicating the flow rate of a fluid 1 traveling through the pipe 2.

Figure 8:
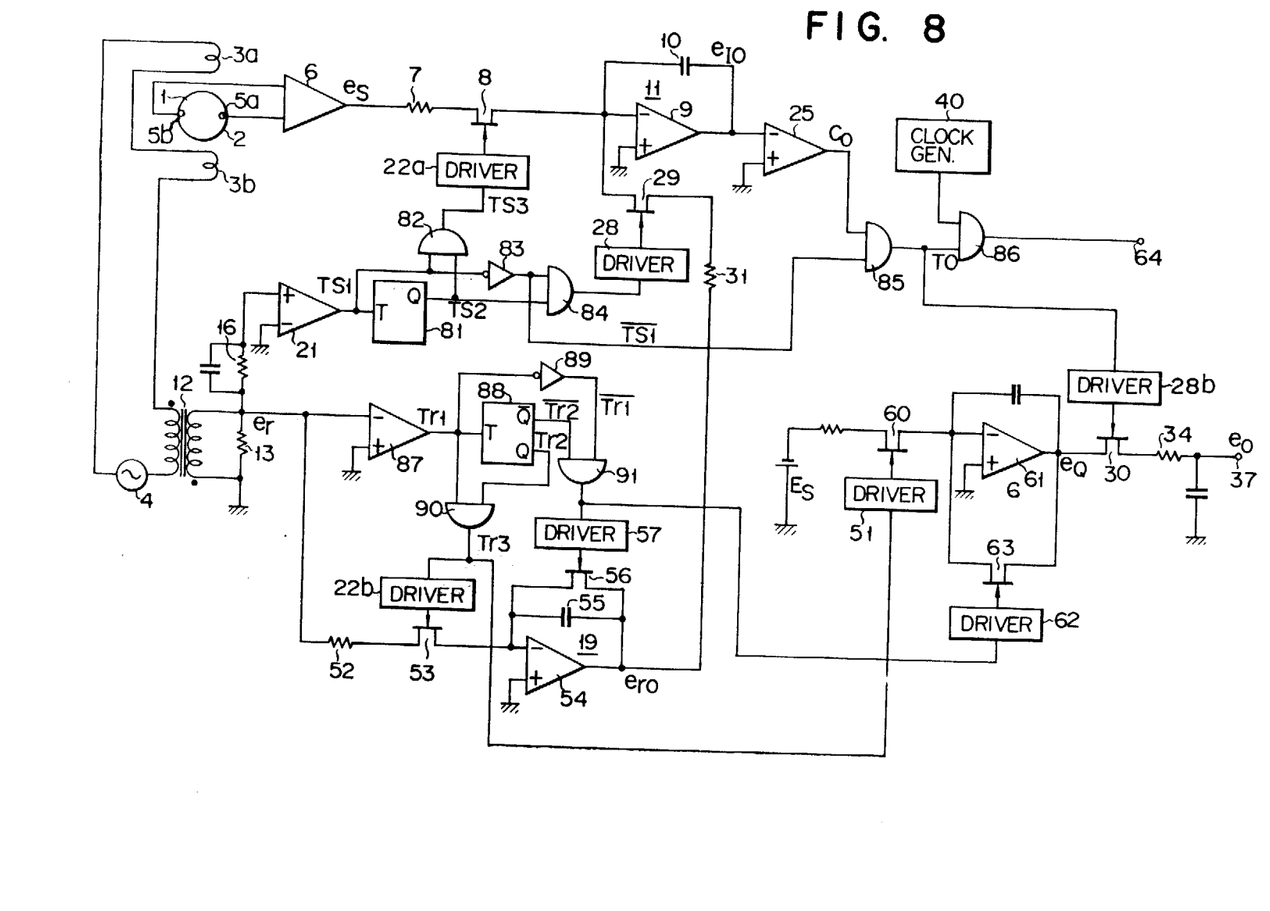
FIG. 8 is a block circuit diagram of a further embodiment of the invention.

Throughout the foregoing embodiments, integration in the integration circuit 11 was carried out once for each period of an output voltage from the amplifier 6. However, this invention is not limited to such arrangement, but may be so designed as to effect integration in said integration circuit 11 once, for example, for every two periods of an output voltage from the amplifier 6. FIG. 8 exemplifies the latter case. The parts of FIG. 8 the same as those of FIG. 4 are denoted by the same numerals. Referring to FIG. 8, the output terminal of the comparator 21 is connected to the terminal T of a binary flip-flop circuit 81, one of the input terminals of an AND gate 82 and the input terminal of an inverter 83. The output terminal Q of the flip-flop circuit 81 and the output terminal of the inverter 83 are connected to both input terminals respectively of an AND gate 84, whose output terminal is connected to the input terminal of the driver 28. The output terminals of the inverter 83 and comparator 25 are connected to both input terminals respectively of an AND gate 85, whose output terminal is connected to one of the input terminals of an AND gate 86 and the input terminal of a driver 28b. The other input terminal of the AND gate 86 is connected to the output terminal of the clock generator 40. The output terminal of the AND gate 86 is connected to the output terminal of the digital signal output terminal 64.

One end of the secondary winding of the transformer 12 is directly connected to the minus input terminal of a comparator 87, whose plus input terminal is grounded. The output terminal of the comparator 87 is connected to the terminal T of a binary flip-flop circuit and one of the input terminals of an AND gate 90. The other input terminal of the AND gate is connected to the output terminal Q of a flip-flop circuit 88. The output terminal of the AND gate 90 is connected to the input terminals of the drivers 22b, 51. The output terminal of an inverter 89 is connected to one of the input terminals of an AND gate 91. The output terminal $\overline{Q}$ of the flip-flop circuit 88 is connected to the other input terminal of the AND gate 91, whose output terminal is connected to the input terminals of the drivers 57, 62.

Figure 9:
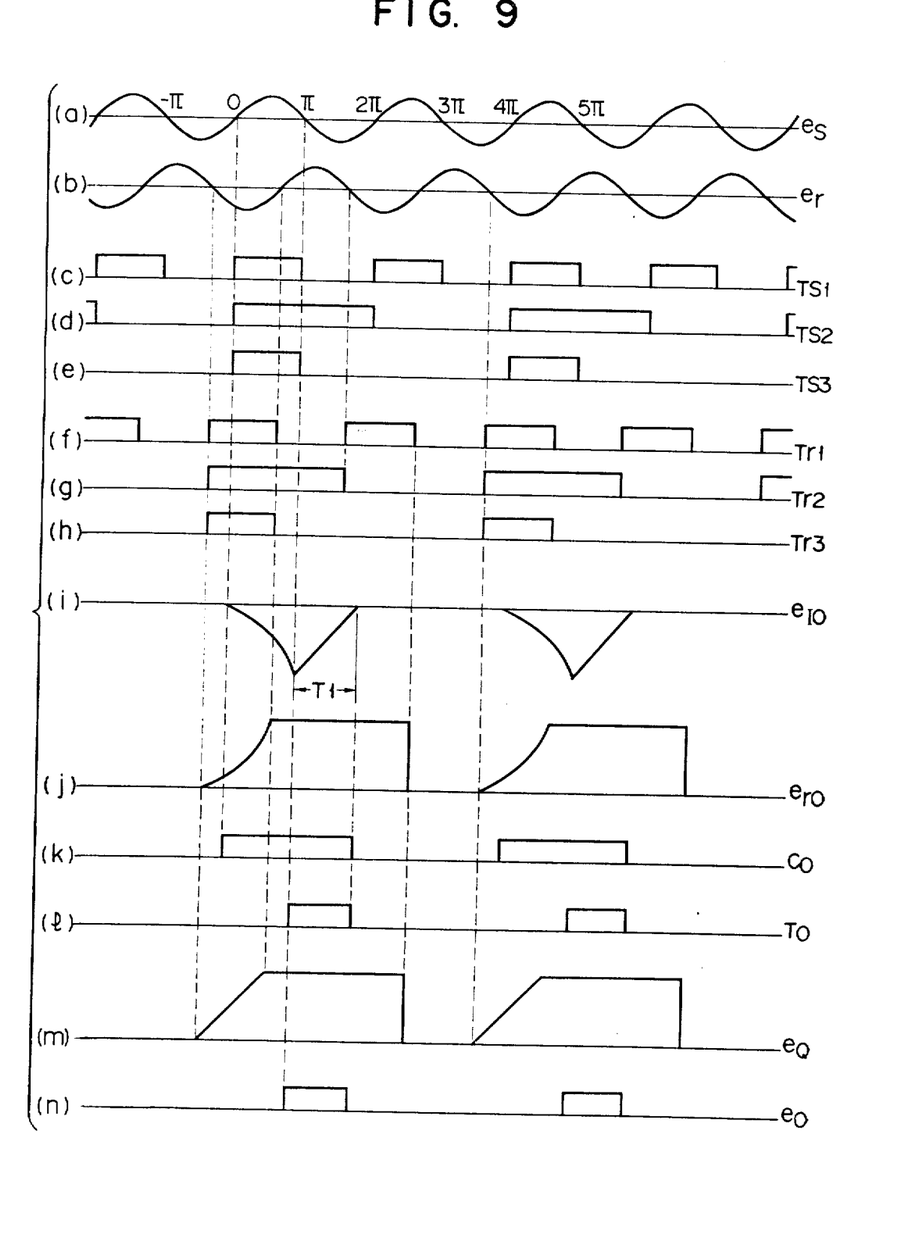
FIG. 9 presents the wave forms of signals by way of illustrating the operation of the flow meter of FIG. 8.

There will now be described by reference to FIG. 9 the operation of a flow meter according to the embodiment of FIG. 8. Now, let it be assumed that an output signal $es$ from the amplifier 6 has a substantially sine wave form as shown in FIG. 9 (a). In this case, it is assumed that the 90°-shifted noise component is not contained in the signal $es$. Therefore, a signal $er$ induced on the secondary side of the transformer 12 has a substantially sine wave form as indicated in FIG. 9 (b). Both signals have, as illustrated, different phases, because the phase of the exiting current in the exiting coils 3a, 3b is differed from that of the magnetic flux generated by the coils 3a, 3b because of the electromagnetic loss therein. The signal $er$ is transmitted to the phase shifter 16 to have its phase equalized with that of the signal $es$, and then conducted to the plus terminal of the comparator 21. Accordingly, an output signal $TS_1$ from the comparator 21 has, as shown in FIG. 9 (c), a positive level synchronizing with the positive level period of the signal $es$. When set by a signal $TS_1$, the flip-flop circuit 81 generates an output signal $TS_2$ from the output terminal Q. This terminal Q output signal $TS_2$ is produced, as shown in FIG. 9 (d), at the rise of signal $TS_1$, and extinguished at the succeeding rise of said signal $TS_1$. An output signal $TS_3$ from the AND gate 82 whose input terminal is supplied with the signals $TS_1$, $TS_2$ is given forth once, as shown in FIG. 9 (e), for every two periods of the signal $es$. The output signal $TS_3$ is delivered to the driver 22a to render the FET 8 conducting. Operation of the FET 8 causes the signal $es$ to be supplied to the integration circuit 11, for example, for a period extending from 0 to $\pi$ so as to be integrated. An output signal $eIO$ generated from the integration circuit 11 for said 0 to $\pi$ period has a wave form shown in FIG. 9 (i).

Voltage $er$ induced on the secondary side of the transformer 12 is further directly delivered to the minus terminal of the comparator 87. An output signal $Tr_1$ from the comparator 87, therefore, takes, as shown in FIG. 9 (f), the form of a positive pulse in correspondence to the negative half period of the signal $er$. The output terminal $Tr_1$ is supplied to the terminal T of the flip-flop circuit 88. The output terminals $\overline{Q}$, Q thereof give forth signals $\overline{Tr_2}$, $Tr_2$ of opposite polarity respectively. The output signal $Tr_2$ from the terminal Q of the flip-flop circuit 88 is produced, as shown in FIG. 9 (g), at the rise of one pulse of the signal $Tr_1$, and extinguished at the rise of the succeeding pulse of said signal $Tr_1$. The two signals $Tr_1$, $Tr_2$ are conducted to the AND gate 90, whose output terminal gives forth, as shown in FIG. 9 (h), a signal $Tr_3$ for every two periods of the signal $er$. The signal $Tr_3$ is supplied to the drivers 22b, 51 to put them into operation. As the result, the FET's 53, 60 are rendered conducting, the signal $er$ is supplied to the integration circuit 19 through the resistor 52 and FET 53, and D.C. voltage $E_s$ is impressed on the integration circuit 61 through the FET 60.

While the signal $Tr_3$ is being produced, the signal $\overline{Tr_3}$ is supplied to the inverter 89, and the output terminal $\overline{Q}$ of the flip-flop circuit 88 generates a signal $\overline{Tr_2}$. At this time, the drivers 57, 62 are not supplied with any signal from the AND gate 91 and the FET's 56, 63 remain inoperative. As the result, the integration circuits 19, 61 are actuated to carry out integration in the positive direction, as shown in FIGS. 9 (j) and (m), for a period corresponding to the signal $Tr_3$, giving forth integrated signals $ero$, $eQ$. Where the signal $Tr_1$ is extinguished during the 0 to $\pi$ period, the inverter 89 produces a signal of 1. The AND gate 91 supplies a drive signal to the drivers 57, 62 to render the FET's 56, 63 conducting. Output signals $ero$, $eQ$ from the integration circuits 19, 61 are held at the levels obtained at that time, as shown in FIGS. 9 (j) and (m).

Where the comparator 21 gives forth an output signal $TS_1$ of 0 when an output signal $es$ from the amplifier 6 has a phase of $\pi$, then the inverter 83 produces an output signal $\overline{TS_1}$ of 1. Since, at this time, an output signal $TS_2$ from the output terminal Q of the flip-flop circuit 81 has a level of 1, the AND gate 84 is opened, and the driver 28 is driven by an output signal from the AND gate 84. As the result, the FET 29 is operated and an integrated output signal $ero$ held by the integration circuit 19 is delivered to the integration circuit 11 through the resistor 31 and FET 29. When the integration circuit 11 which produces a negative integrated output signal $eIO$ during the 0 to $\pi$ period is supplied with a positive signal $ero$, said integrated output signal $eIO$ rises in the positive direction as shown in FIG. 9 (i) and is returned to zero level in a time $T_1$ after the point of time $\pi$.

Where the comparator 21 gives forth an output signal $TS_1$ of 0 at the point of time $\pi$, then an output signal of 1 from the inverter 83 is also delivered to the AND gate 85. Since, at this time, an output signal CO from the comparator 25 has a level of 1, as shown in FIG. 9 (k), the AND gate 85 gives forth an output signal TO of 1, as shown in FIG. 9 (l). The output signal TO opens the AND gate 86 and actuates the driver 28b. A clock pulse signal from the clock pulse generator 40 is conducted from the AND gate 86 to the digital output terminal 64. Operation of the driver 28 renders the FET 30 conducting, causing the signal $eQ$ of FIG. 9 (m) to be supplied to the smoothing circuit 34 through the FET 30. At this time, a signal $eO$ is generated from the analogue output terminal 37 via the smoothing circuit 34.

When an output signal $eIO$ from the integration circuit 11 is brought to zero level in a time $T_1$, which is proportional to the flow rate, after the point of time $\pi$, then the comparator 25 gives forth a signal CO of 0 to close the AND gate 85. As the result, an output signal $T_0$ from the AND gate 85 is set at a level of 0 to put the FET 30 out of operation, thereby extinguishing the output signals from the digital output terminal 64 and analogue output terminal 37 which correspond to the period $T_1$. When the signal $Tr_1$ is brought to a level of 0 during the period of $2\pi$ to $3\pi$, the AND gate 90 is closed to render the FET's 53, 60 inoperative, with the result that the signals $er$, $E_s$ cease to be supplied to the integration circuits 19, 61, and that the output signals $ero$, $eQ$ are brought to zero level, as shown in FIGS. 9 (j) and (m).

In the succeeding period of $3\pi$ to $4\pi$, the signals $Tr_3$, $ero$, $eQ$ rise all alike, and an integrated output signal $eIO$ is again obtained at the point of time $4\pi$. The foregoing operation is repeated thereafter.

Figure 10:
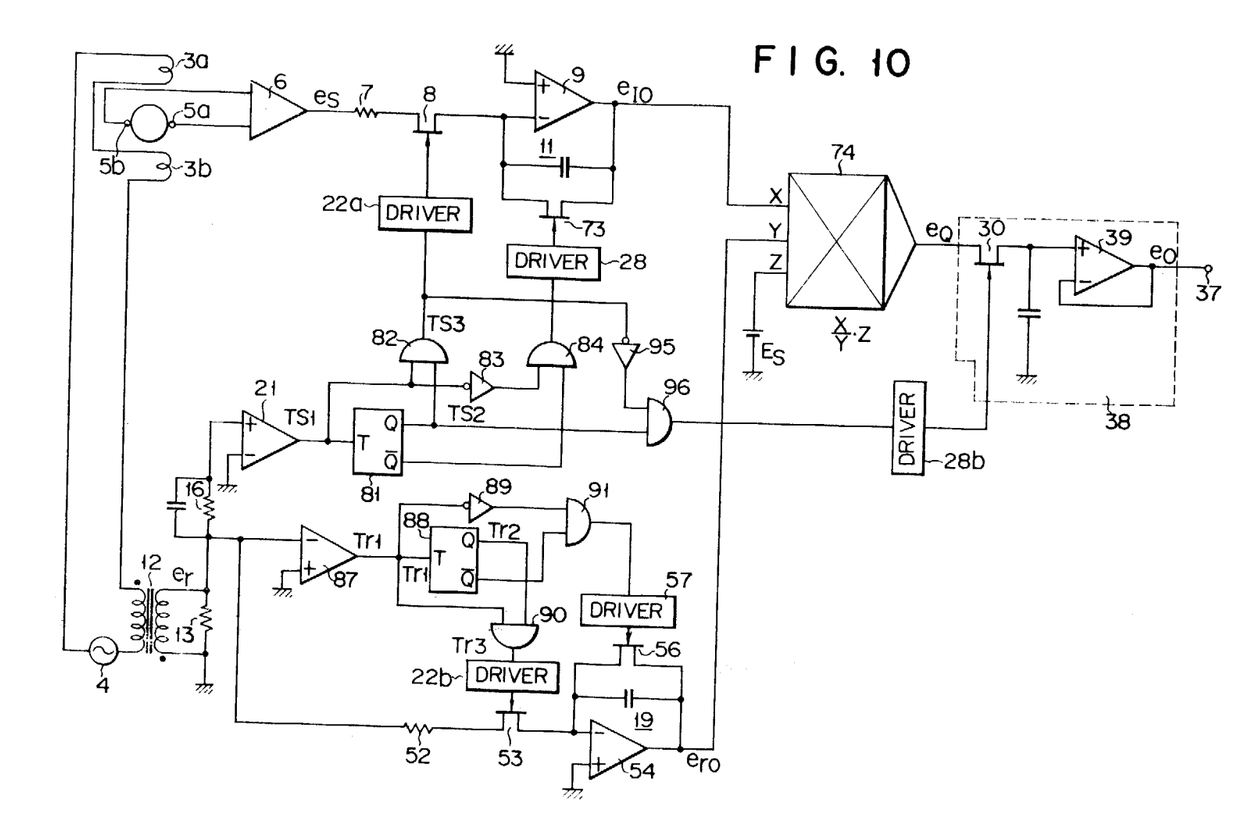
FIG. 10 is a block circuit diagram of still further embodiment of the invention.

FIG. 10 shows the block circuit diagram of a flow meter according to a further embodiment of the invention where integration in the integration circuit 11 is carried out once for every two periods of output voltage from the A.C. source 4. The parts of FIG. 10 the same as those of FIG. 8 are denoted by the same numerals. Referring to FIG. 10, the output terminal of the AND gate 82 is connected to the input terminals of the driver 22a and inverter 95. The output terminal of the inverter 95 is connected to one of the input terminals of the AND gate 96, the other input terminal of which is connected to the Q output terminal of the binary flip-flop circuit 81. The output terminal of the AND gate 96 is connected to the input terminal of the driver 28b. The $\overline{Q}$ output terminal of the flip-flop circuit 81 is connected to one of the input terminals of the AND gate 84, the other input terminal of which is connected to the output terminal of the comparator 21 through the inverter 83. The output terminal of the driver 28b is connected to the gate electrode of the sampling FET 30 included in a sampled value holder 38. One of the electrode terminals of the sampling FET 30 is connected to the plus terminal of an operational amplifier 39, the output terminal of which is connected to the analogue signal output terminal 37.

Figure 11:
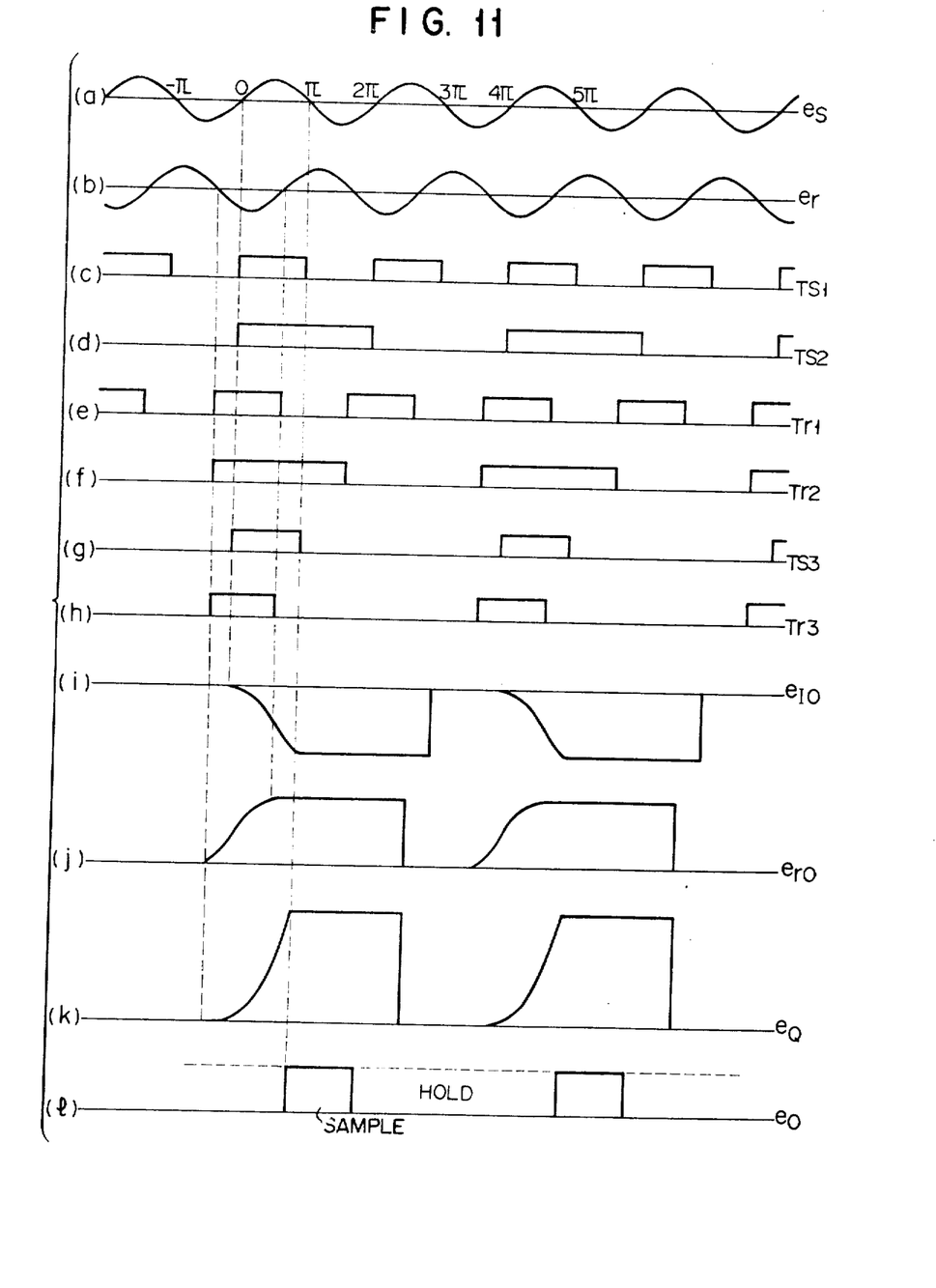
FIG. 11 indicates the wave forms of signals by way of illustrating the operation of the flow meter of FIG. 10.

There will now be described by reference to FIG. 11 the operation of the embodiment of FIG. 10. The signals $es$, $er$, $TS_1$, $TS_2$, $TS_3$, $Tr_1$, $Tr_2$, $Tr_3$ are the same as those of FIG. 8, as seen from FIGS. 11 (*a*) to 11 (*h*). Where the AND gate 90 generates a signal $Tr_3$ for a length of time extending between the point of time at which, for example, the signal $es$ has a phase angle of $-\pi$ and that at which said signal $es$ has a phase angle of 0, then the FET 53 is rendered conducting and the integration circuit 19 generates a signal $ero$ as shown in FIG. 11 (*j*). This signal $ero$ is supplied to the multiplier-divider 74 as a Y signal. Since at this time, the output signal $elO$ from the integration circuit 11 which is supplied as an X signal to said multiplier-divider 74 has a level of zero, an output signal $eQ$ from said multiplier-divider 74 continues to have a zero level as shown in FIG. 11 (*k*). When the voltage signal $es$ has a phase angle of 0, then the AND gate 82 gives forth a signal $TS_3$ to actuate the driver 22*a*, and the voltage signal $es$ is conducted to the integration circuit 11 so as to be integrated, and an output signal $elO$ from the integration circuit 11 increases in the negative direction as shown in FIG. 11 (*i*). While a signal $Tr_3$ maintains a level of 0 for the period in which the phase angle of said signal $Tr_3$ changes from 0 to $\pi$, then the FET 53 is rendered inoperative, and the output signal $ero$ from the integration circuit 19 thereafter maintains the level obtained at that time. The multiplier-divider 74 which is supplied with three input signals X, Y, Z during the above-mentioned period extending between the phase angles 0 and $\pi$ generates a progressively increasing signal $eQ$ as shown in FIG. 11 (*k*).

When the voltage signal $es$ has a phase angle of $\pi$, the comparator 21 produces a signal $TS_1$ of 0, and the inverter 83 gives forth a signal of 1. Since, at this time, a $\overline{Q}$ output signal from the flip-flop circuit 81 has a level of 1, the AND gate 84 is opened, causing a driving signal to be supplied therefrom to the FET 73 through the driver 28. As the result, the FET 73 is actuated and the output signal $elO$ from the integration circuit thereafter maintains the level obtained at that time as shown in FIG. 11 (*i*). When said output signal $elO$ is thus held at a certain level, then the three input signals X, Y, Z supplied to the multiplier-divider 74 and in consequence an output signal $eQ$ therefrom also have a fixed level as shown in FIG. 11 (*k*). When the output signal $eQ$ has a fixed level and the signal $TS_3$ has its level shifted to 0, then the AND gate 96 is opened. Accordingly, the FET 30 is operated by the driver 28*b*, causing the output signal $eQ$ from the multiplier-divider 74 to be supplied to the sampled value holder 38. Accordingly, the output terminal 37 of the operational amplifier 39 gives fort a signal $eo$ whose sampled level value has been held as shown in FIG. 11 (*l*). This signal $eo$ continues to be produced until the AND gate 96 is closed upon the shifting of the level of the signal $TS_2$ to 0. Namely, said signal $eo$ appears for a length of time corresponding to half the period of the output voltage signal $es$ from the amplifier 6 which denotes a measured flow rate. When the output signal $Tr_1$ from the comparator 87 has its level brought to 0 during a period extending between the phase angles $2\pi$ and $3\pi$ and in consequence the AND gate 90 is closed, then the signal $ero$ also has its level set at 0. The multiplier-divider 74 now supplied with a Y signal ($ero$) of 0 generates an output signal $eQ$ also of 0. When the signal $TS_1$ has its level brought to 0 at the point of time at which said signal $TS_1$ has a phase angle of $3\pi$, then the FET 8 is rendered inoperative and the integration circuit 11 generates a signal $elO$ of 0. The integration circuit 11 thereafter repeats the above-mentioned cycle of operation with a length of time extending between the phase angle points $-\pi$ and $3\pi$ taken as one period.

Further, if the sample-hold time is properly set shorter than that of one shown in FIG. 11 (*l*), the output of this flow meter will be obtained within one cycle of the signal $er$.

What is claimed is:

1. An electromagnetic flow meter comprising a pipe for conducting a fluid; a magnetic flux generator for applying an A.C. magnetic flux to a fluid traveling through the pipe; a detection circuit fitted to the pipe so as to generate a detection signal proportional to a product arrived at by multiplying together the inner diameter of the pipe, the density of the A.C. magnetic flux and the running speed of the fluid; a device for generating an A.C. voltage proportional to the A.C. magnetic flux; a first switch supplied with the detection signal; a first switch-controlling circuit for closing the first switch for at least a positive or negative half period of the generated A.C. voltage; an A.C.-D.C. converting circuit for converting said A.C. voltage to a D.C. voltage; a second switch to which an output from said A.C.-D.C. converting circuit is supplied with an opposite polarity to the detection signal; an integration circuit for integrating outputs from the first switch and thereafter integrating outputs from the second switch; a second switch-controlling circuit for closing the second switch after said positive or negative half period and opening the second switch when an output from the integration circuit reaches a referential level; and an output device for producing an output indicating the flow rate of the fluid corresponding to the period in which outputs from the A.C.-D.C. converting circuit are integrated, for each operating cycle of said integration circuit.

2. An electromagnetic flow meter according to claim 1 wherein the first switch-controlling circuit comprises a phase shifter for causing the phase of an output from the A.C. voltage generator to coincide with the phase of a detection signal; a comparator supplied with an output from the phase shifter and designed to compare the level of an output from the phase shifter with the referential level and produce an output signal in synchronization with the detection signal; and a first switch-driving circuit for closing the first switch according to an output from the comparator.

3. An electromagnetic flow meter according to claim 2 wherein the A.C.-D.C. converting circuit comprises a second switch-driving circuit actuated by an output from the comparator; a third switch having its operation controlled by an output from the second switch-driving circuit and connected at one end to the output terminal of the A.C. voltage generator; an amplifier for arithmetic operation whose negative terminal is connected to the other end of the third switch and whose positive terminal is grounded; an integration capacitor connected between the input and output terminals of the arithmetic operation amplifier; and a fourth switch connected parallel to the integration capacitor and rendered coñducting for a prescribed period after the second switch is opened.

4. An electromagnetic flow meter according to claim 1 wherein the A.C.-D.C. converting circuit includes a rectifying circuit consisting of a diode connected at one end to the output terminal of the A.C. voltage generator; a capacitor connected between the other end of the diode and the ground; and a resistor connected between the other end of the diode and the second switch.

5. An electromagnetic flow meter according to claim 1 wherein the second switch-controlling circuit comprises a comparator whose positive terminal is supplied with an output from the integration circuit and whose negative terminal is grounded; a NAND gate, one input terminal of which is supplied with an output from the comparator and the other input terminal of which is supplied with an output from the first switch-controlling circuit through a first inverter; and a switch driving circuit supplied with an output from the NAND gate through a second inverter and designed to deliver an output to the second switch.

6. An electromagnetic flow meter according to claim 1 wherein the output device consists of a third switch having its operation controlled by an output from the second switch-controlling circuit; a power source connected to one end of the third switch so as to supply a direct current having a referential voltage; and a smoothing circuit connected to the other end of the third switch, thereby producing from the output terminal of the flow meter an analogue output corresponding to the flow rate of a fluid passing through the pipe.

7. An electromagnetic flow meter according to claim 6 wherein the output device comprises a fourth switch connected at one end between the power source for supplying a direct current having a referential voltage and the third switch and operated in synchronization with the first switch; an operational amplifier whose negative terminal is connected to the other end of the fourth switch whose positive terminal is grounded and whose output terminal is connected to the third switch; an integration capacitor connected between the input and output terminals of the operational amplifier; and a fifth switch connected parallel between both ends of the integration capacitor, and closed for a prescribed period after the second switch is opened.

8. An electromagnetic flow meter according to claim 1 wherein the output device comprises a clock pulse generator for generating clock pulses; a NAND gate, one input terminal of which is supplied with an output from the clock pulse generator and the other input terminal of which is supplied with an output from the second switch-controlling circuit; frequency dividing means supplied with an output from the NAND gate and designed to divide the frequency of said output into a prescribed number of components; and a counter for counting the frequencies of outputs from the frequency dividing means.

9. An electromagnetic flow meter comprising a pipe for conducting a fluid; an A.C. source; a magnetic flux generator connected to the A.C. source to apply an A.C. magnetic flux to a fluid traveling through the pipe; a detection circuit fitted to the pipe to generate a detection signal proportional to a product arrived at by multiplying together the inner diameter of the pipe, the density of the A.C. magnetic flux and the running speed of the fluid; a transformer connected to the A.C. source; a device connected to the secondary winding of the transformer to generate an A.C. voltage in proportional to the A.C. magnetic flux; a first switch supplied with the detection signal; a second switch connected to the secondary winding of the transformer; a first integration circuit connected to the first switch; a second integration circuit connected to the second switch; a third switch supplied with an output signal from the second integration circuit; means for connecting the output terminal of the third switch to the input terminal of the first integration circuit; a first switch-controlling circuit for closing the first switch for half the period of the A.C. voltage generated; a second switch-controlling circuit for closing the third switch immediately after said half period in which the first switch is closed; gate-signal generating means for giving forth a gate signal for the period in which an output signal from the first integration circuit reaches a prescribed level after the closing of the third switch; a second gate circuit opened upon receipt of the gate signal; a clock pulse generator for supplying clock pulses to the first gate circuit; means for impressing a D.C. voltage on the second gate circuit; and an output device supplied with digital and analogue output signals denoting the flow rate of a liquid from the output terminals of the first and second gate circuits.

10. An electromagnetic flow meter according to claim 9 wherein the output device comprises a NAND gate supplied with output signals from the first inverter and delay circuit; a second inverter supplied with an output signal from the NAND gate; a driver supplied with an output signal from the second inverter; and means for holding the sampled value of an output signal from the multiplier/divider when supplied with an output signal from the driver.

11. An electromagnetic flow meter comprising a pipe for conducting a fluid; a magnetic flux generator for applying an A.C. magnetic flux to a fluid traveling through a pipe; a detection circuit fitted to the pipe so as to generate a detection signal proportional to a product arrived at by multiplying together the inner diameter of the pipe, the density of the A.C. magnetic flux and the velocity of the fluid running through the pipe; an A.C. voltage generator for generating an A.C. voltage in synchronization with the A.C. magnetic flux; a first switch supplied with the detection signal; a second switch supplied with the A.C. voltage; a first switch-controlling circuit for closing the first and second switches for at least a positive or negative half period of the generated A.C. voltage; first and second integration circuits for integrating outputs from the first and second switches respectively; an inverter connected to the output terminal of the first switch-controlling circuit; a delay circuit connected to the output terminal of the inverter; an integration-controlling circuit for zeroing integrated outputs from the first and second integration circuits; a multiplier-divider supplied with outputs $x$ and $y$ from the first and second integration circuits and an output $z$ from a power source for generating an output having a referential voltage and designed to carry out the arithmetic operation of said three outputs by the formula of $x \cdot z/y$; and an output device for producing an output indicating the flow rate of the fluid passing through the pipe from an output from the multiplier-divider.

12. An electromagnetic flow meter according to claim 11 wherein the sampled value-holding means comprises a switch whose operation is controlled by an output signal from the driver and one terminal of which is supplied with an output signal from the multiplier-divider; an operational amplifier connected to the other terminal of said switch and a capacitor connected between said other terminal of the switch and the ground.

13. An electromagnetic flow meter comprising a pipe for conducting a fluid; an A.C. source; a magnetic flux generator connected to the A.C. source to apply an A.C. magnetic flux to a fluid traveling through the pipe; a detection circuit fitted to the pipe to generate a detection signal proportional to a product arrived at by multiplying together the inner diameter of the pipe, the density of the A.C. magnetic flux and the running speed of the fluid; a transformer connected to the A.C. source; a device connected to the secondary winding of the transformer to generate an A.C. voltage synchronous with the A.C. magnetic flux; a first switch supplied with the detection signal; a second switch connected to the secondary winding of the transformer; a first integration circuit connected to the first switch; a second integration circuit connected to the second switch; a referential voltage source; a multiplier-divider supplied with output signals X, Y from the first and second integration circuits and an output signal Z from the referential voltage source to carry out an arithmetic operation of $(X/Y) \cdot Z$; and a sampled value holder for holding the sampled value of an output signal from the multiplier-divider for at least half the period of the A.C. voltage.

* * * * *